United States Patent [19]
Focht

[11] Patent Number: 5,410,429
[45] Date of Patent: Apr. 25, 1995

[54] HEATER ASSEMBLY FOR MICROSCOPE OBJECTIVES

[75] Inventor: Daniel C. Focht, 334 Heist Rd., Butler, Pa. 16001

[73] Assignee: Daniel C. Focht, Butler, Pa.

[21] Appl. No.: 43,538

[22] Filed: Apr. 6, 1993

[51] Int. Cl.⁶ ............................................. G02B 21/28
[52] U.S. Cl. .................................... 359/395; 359/398
[58] Field of Search ................. 359/395, 398; 219/200

[56] References Cited

U.S. PATENT DOCUMENTS

| | | | |
|---|---|---|---|
| 4,629,862 | 12/1986 | Kitagawa | 359/395 |
| 4,888,463 | 12/1989 | Middlebrook | 359/395 |
| 5,257,128 | 10/1993 | Diller | 359/395 |

*Primary Examiner*—Eugene R. LaRoche
*Assistant Examiner*—A. Zarabian

[57] ABSTRACT

A heater assembly for microscope objectives is disclosed. The assembly includes a loop-shaped flexible heating element sized and constructed to surround and operatively engage microscope objectives of different sizes. The heating element is fixed to a rigid housing. A thermistor is fixed in one end section of a slidable, tubular member arranged with the housing to translate towards and away and into and out of engagement of the thermistor with microscope objectives. Electrical conducting wiring connects the heating element and thermistor with a controllable heat energy for regulating the heat energy source to the microscope objective. The housing also supports a lock screw for securing the tubular member with the housing.

5 Claims, 1 Drawing Sheet

HEATER ASSEMBLY FOR MICROSCOPE OBJECTIVES

BACKGROUND OF THE INVENTION

This invention relates to a heater assembly for use with microscope objectives.

When using light microscopes with immersion objectives for observing and studying different samples or specimens it is often necessary that temperature control of the samples be accurately maintained. This need for temperature control is especially required in live cell chamber microscopy to accommodate the characteristics of different samples. Temperatures must be maintained or controlled in the media flow region, and once the required temperature has been obtained it must be stabilized. My U.S. Pat. No. 4,974,952 issued on Dec. 4, 1990, describes more fully the need for stabilized and accurate chamber temperature in live cell chambers. It has been found that the temperatures of microscope objectives has an effect on the temperature of live cell chambers. It is, therefore, necessary to maintain a desired temperature of the microscope objectives so that the live cell chamber temperatures are properly maintained to thereby insure the proper characteristics of the samples being studied.

Various attempts have been made to control the temperatures of microscope objectives. One device used was a cylindrical or bobbin-like heater fixed to the objective with the heater temperatures being monitored. Another method was to direct heated air across the objective. In both cases, there was no monitoring of the actual temperature of the objective. Variations of the temperatures of the objective resulted in an adverse effect on the temperature of the different samples in the live cell chambers over. The actual temperatures of the microscope objectives might vary from the heater temperature or the temperatures of the flowing heated air because of such factors as the thermal conditions surrounding the microscope or the heat sinking properties of the microscope.

The heater assembly of my present invention overcomes the heretofore problem of maintaining accurate temperatures of microscope objectives and live cell chambers. My heater assembly senses the actual temperature of the microscope objective independently of surrounding conditions and regulates the temperature consistent with the actual temperature. By accurately maintaining the temperature of the microscope objective consistent with the temperature of the live cell chamber, the temperature of the specimen is accurately stabilized and maintained thereby accommodating the characteristics of the specimen being studied. The new results of the heater assembly of my present invention are achieved with a simple combination of simple elements which allow use of my invention with microscope objectives of different sizes.

SUMMARY OF THE INVENTION

This invention is a heater assembly for microscope objectives which preferably comprises: a main housing member; heating means supported by the housing member for removably communicating with and transmitting heat energy to microscope objectives; temperature sensing means supported by the housing member for sensing the temperature of microscope objectives; and connection means for operatively connecting the heating means and the temperature sensing means to a controllable heat energy source. The heating means may be a flexible, loop-shaped heating element such as an insulated electrical resistance heating, sized and shaped to surround and engage microscope objectives of different external diameters. The objective temperature may be sensed electronically with the use of a thermistor housed in a tubular member selectively translatable in the housing member to be moved into and out of engagement with microscope objectives. Locking means such as a manually rotatable set screw or spring device, received in the housing member may be included for engaging and securing the tubular member in place with the thermistor in engagement with a microscope objective.

My heating assembly is a combination of simple elements which together allow for accurate sensing of the temperature of microscope objectives and providing heat energy to the objectives for regulating and maintaining desired temperatures. By so providing, the desired temperatures of live cell chambers may be accurately maintained thereby insuring the proper characteristics of different samples to be studied.

Various other advantages, details, and modifications of the present invention will become apparent as the following descriptions of a certain present preferred embodiment proceeds.

DESCRIPTION OF THE DRAWINGS

In the accompanying drawings I show a certain present preferred embodiment of my invention in which.

DESCRIPTION OF A PREFERRED EMBODIMENT

Figure 1:
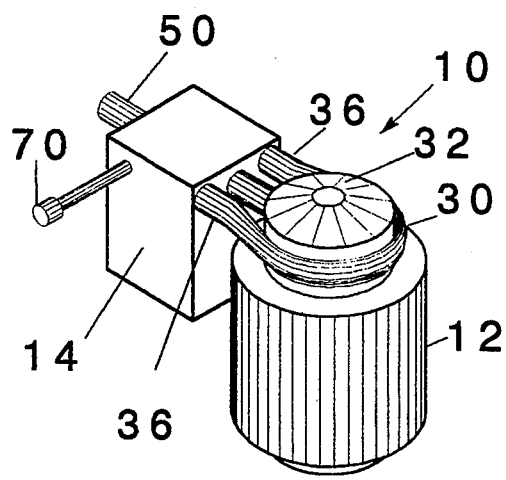
FIG. 1 is a perspective view of a heater assembly of microscope objectives embodying my present invention.
Figure 2:
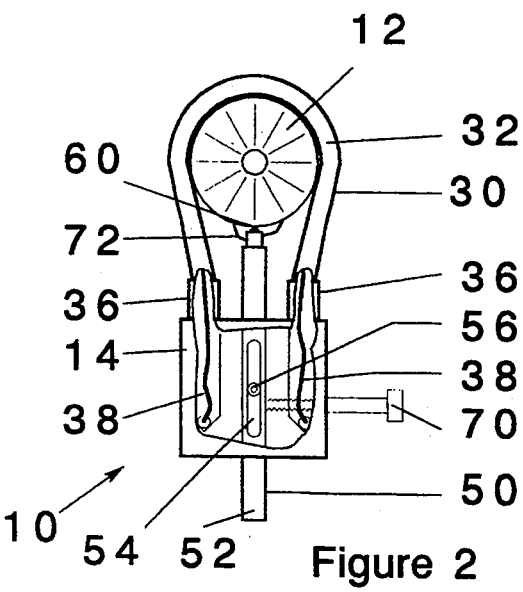
FIG. 2 is a plan view of the heater assembly of FIG. 1 with the housing member being broken away showing details of construction; and an outline of a microscope objective shown in engagement with the heating element and thermistor of the temperature sensing element.

Referring now to the drawings there is shown a heater assembly 10 embodying the present invention, and constructed, sized, and shaped to surround and engage the cylindrical free end section of a typical microscope objective 12. The heater assembly 10 includes a generally cubic shaped rigid main housing member 14 which is generally hollow inside with a closed top and open bottom.

A loop-shaped, flexible heating element assembly 30 is supported by the main housing member 14, and is constructed, sized, and shaped to surround and engage microscope objectives of different external diameters. The heating element assembly 30 includes a loop of a flexible ribbon 32 of suitable material such as braided vinyl coated fiberglass embedding insulated flexible electrical conducting heating wires 35, five shown with more or less being useable as desired. The internal ends of the ribbon 32 are fixed in collars 36 secured to upper front surface portions of the housing member 14. The heating wires 35 are connected with electrically conductive wires 38 which are in turn connected with a controllable electrical heat energy source 40, shown schematically, of any well known type and not forming part of the present invention.

Figure 3:
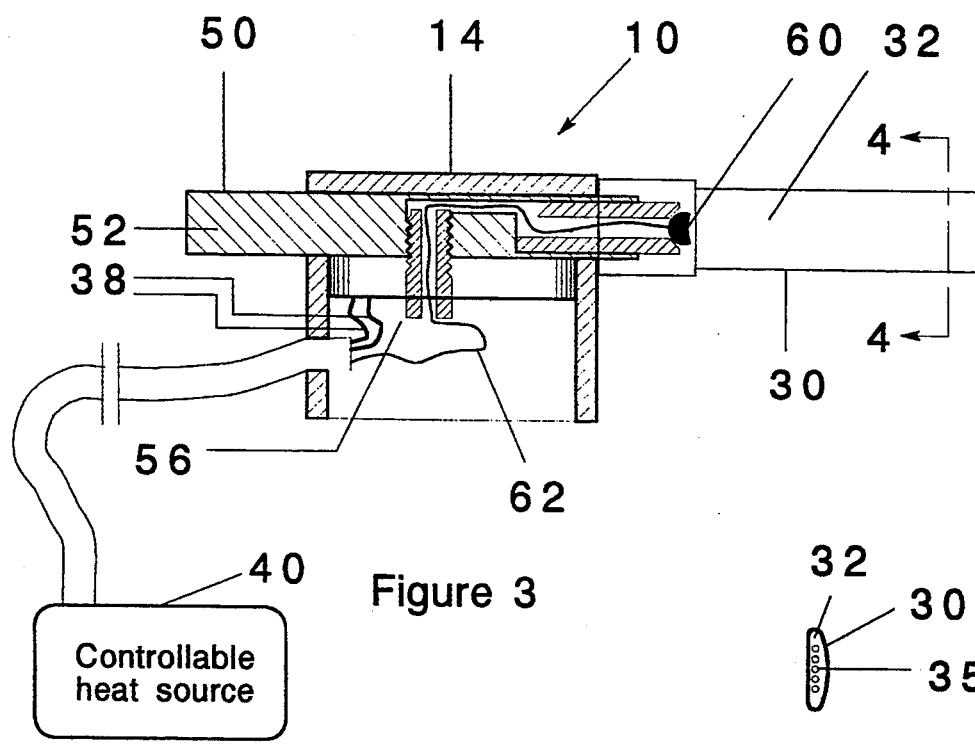
FIG. 3 is a side elevation view in section of the heater assembly of FIG. 1 with the housing member thereof broken away to show details of construction, and a schematic representation of a microscope objective in position to be engaged by the heater element of the assembly and schematically illustrating a controllable heat energy source operatively connected with the heater assembly.
Figure 4:
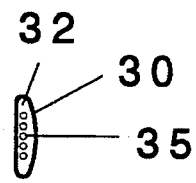
FIG. 4 is an exploded view looking along the line 4—4 of FIG. 3 showing the heating wires of the heating element.

A temperature sensor unit 50 is operatively received in and supported by the housing member 14. The temperature sensor unit 50 includes an elongated tubular element 52 disposed centrally and slidably of the main housing 14 and generally coplanar with the heating element 30, with one end portion of the heating element extending outwardly of the back end of the main housing and the other end portion extending outwardly of the front end of the main housing into the confines defined by the loop shaped heating element 30, as shown in FIGS. 1 and 3. The tubular element 52 is provided with an axially extending slot 54 into which is positioned an upright hollow screw 56. The slot 54 and hollow screw 56 are size and shaped such that the tubular element 52 may be slidably translated relative to the body of housing member 14. Fixed in the forward end portion of the tubular element 52 is a thermistor 60 of any well-known configuration and make-up, to which is connected suitable wiring 62 which panes through hollow screw 56 and in turn is connected with the controllable heat energy source 40. Suitable electrical insulation separates thermistor 60 from the tubular element 52. A set screw 70 is threadedly received in a side section of the housing member 14 at, a position for its free end to engage a section of the tubular element 52 whereby the tubular element may be secured and locked in a desired position relative to the housing member 14.

A heat barrier or shield 72 in the form of thermal paste is placed around the thermistor 60 and microscope objective 12 to insure that the thermistor senses the temperature of the objective and not some combination of the ambient temperature and objective temperature.

In its operation the heater assembly 10 is positioned to place the heating element assembly 30 around and in engagement with the cylindrical portion of microscope objective 12. The temperature sensor unit 50 is positioned by sliding the tubular element 52 until the thermistor 60 with a body or heat shield 72 surrounding it engages a surface portion of the microscope objective 12. Set screw 70 is turned to engage and lock the tubular element 52 in place. The pressure between the loop of the heating element 32 and the microscope objective 12 is maintained by securing and locking the tubular element 52 in place to the housing member 14. The thermistor 60 will sense the actual temperature of the microscope objective 12 and send the signal to the heat energy source 40 where the heat energy to the heating element 30 will be suitable controlled to regulate the temperature of the objective 12 independently of the surrounding ambient thermal conditions or heat sinking properties of the microscope. In turn the temperature of the objective will be consistent with the temperature of the live cell chamber, thereby stabilizing the temperature of the specimen and accommodating the desired characteristics of the specimen being studied with the microscope.

It should now be clearly recognized by those skilled in this art how the present invention overcomes the problems and drawbacks of the heretofore methods and means of regulating the temperatures of microscope objectives. The basic elements forming this invention are simple in structure and their combination is also simple and efficient. Other modifications of the elements forming the present invention might also be recognized by those skilled in this art.

While I have shown and described a present preferred embodiment of this invention, it is to be distinctly understood that the invention is not limited thereto, but may be otherwise embodied within the scope of the following claims.

I claim:

1. A heater assembly for microscope objectives, comprising:

A main housing member; heating means supported by said housing member for removably communicating with and transmitting heat energy to microscope objectives; temperature sensing means supported by said housing member for sensing temperature of said microscope objective; and connection means for operatively connecting said heating and temperature sensing means to a controller.

2. The heater assembly as set forth in claim 1 wherein said heating means is comprised of a flexible heating element of appropriate dimension to attach to said microscope objectives of different diameters.

3. The heater assembly as set forth in claim 1 wherein said temperature sensing means includes an electronic contact probe.

4. The heater assembly as set forth in claim 1 wherein said temperature sensing means or heater element is adjustable and securable for the purpose of fastening the assembly to the objective.

5. The heater assembly as set forth in claim 1 wherein said temperature sensing means includes a thermally isolated support which can operatively engage said microscope objectives when said' heater element is mated to the objective.

* * * * *